United States Patent Office 2,935,729
Patented May 3, 1960

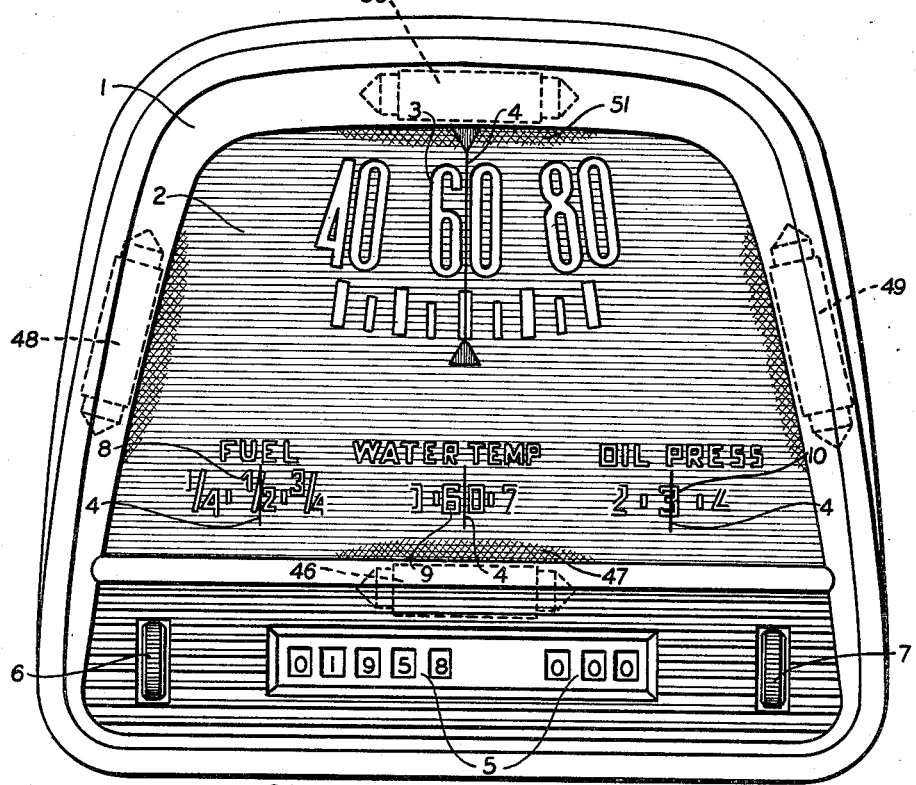
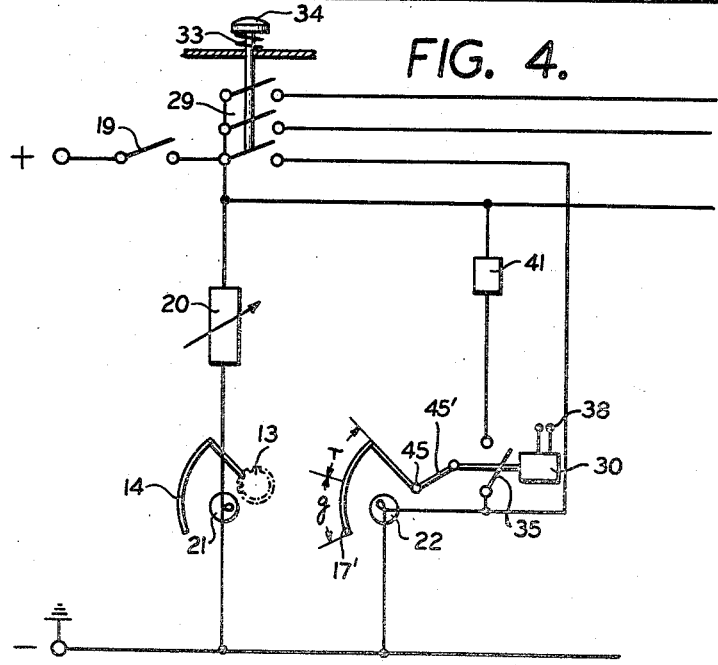

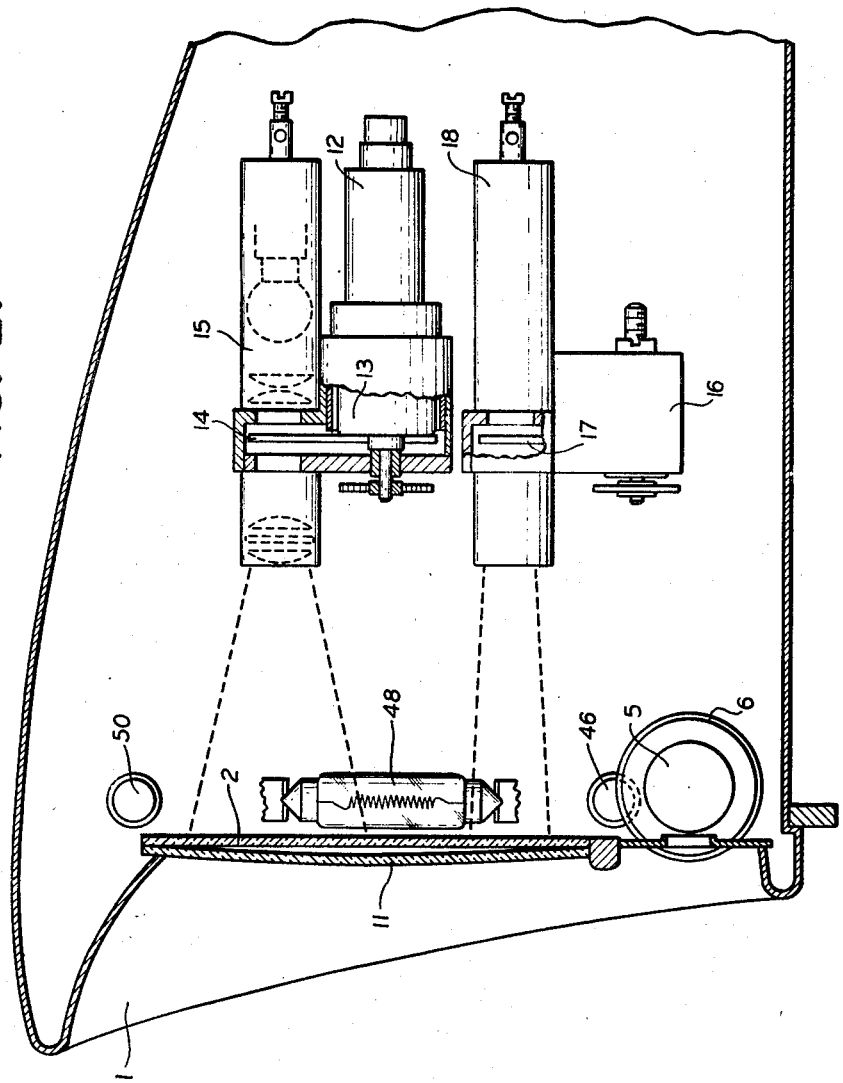

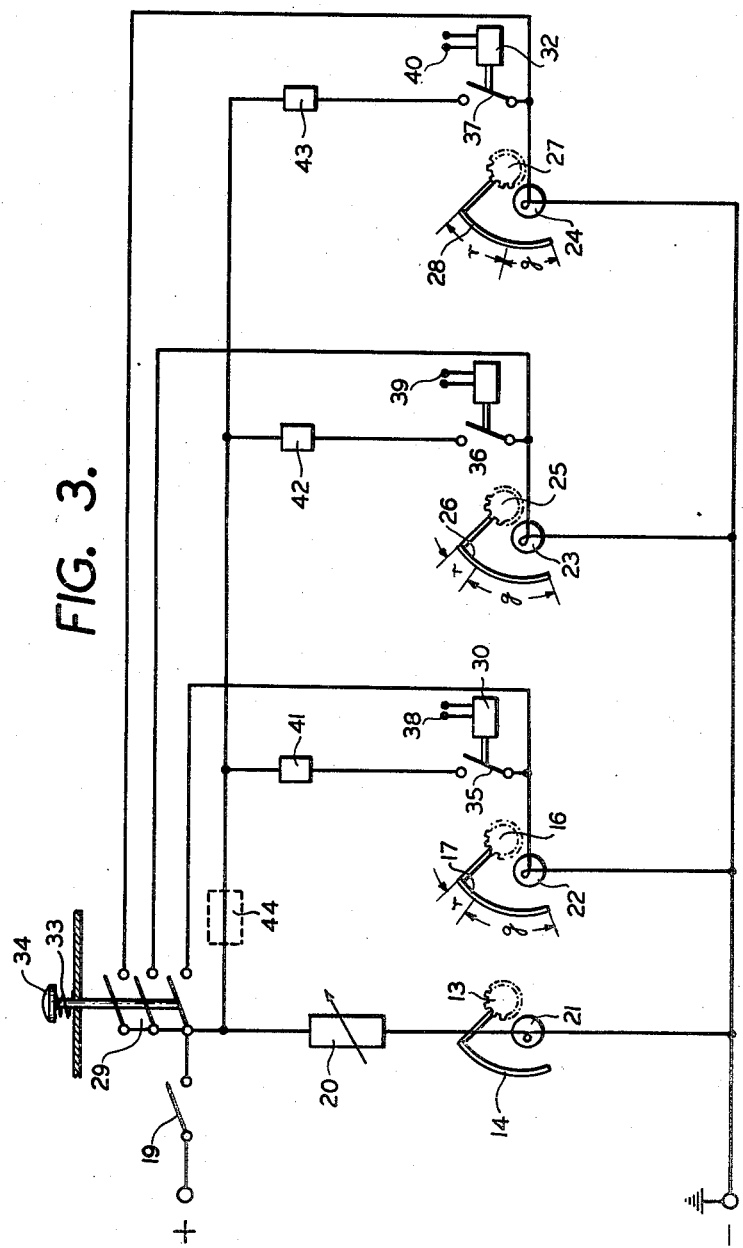

2,935,729

MEASURING DEVICES AND WARNING INSTRUMENTS TO INDICATE OPERATING CONDITIONS OF A VEHICLE

Heinrich Heuss, Frankfurt am Main, Germany, assignor to Firma Vdo Tachometer Werke Adolf Schindling G.m.b.H., Frankfurt am Main, Germany, a corporation of Germany Application February 5, 1959, Serial No. 791,372

Claims priority, application Germany February 15, 1958

10 Claims. (Cl. 340—52)

The present invention relates to a combination implement for automotive vehicles.

It is known to provide on the dashboard of automotive vehicles measuring devices and warning instruments to indicate the conditions of operation of the vehicle, either as individual instruments, or also jointly for several instruments in the form of so-called combination implements. In both instances, an indicating scale or other indicating means are provided always visible for each measuring or indicating device. In view of the developments in improvement of automotive vehicles, the number of measuring or indicating devices has been increased on the dashboard, particularly in luxury vehicles which are equipped with a better technical arrangement, so that the plurality of scales to be observed by the driver and the indicating means reach the point of being disturbing. Each indicating scale which is added brings about a reduction of the attention of the driver to the traffic conditions.

It is, therefore, one object of the present invention to provide a new type of combination device for automotive vehicles, which on the one hand reduces to a minimum the amount of deviation of the driver's attention due to the plurality of instruments on the dashboard, and on the other hand, maintains all technical measuring control and warning indicating means in full.

It is another object of the present invention to provide a combination device for automotive vehicles, which is equipped with means for projecting, by means of optical projecting devices, all indications of the conditions of operation of the vehicle onto a single, neutral indicating face, preferably an opaque plate. It is known to project the measuring values of individual instruments, particularly for a very large indication, for instance in connection with clocks having jumping number indication.

It is yet another object of the present invention to dispose the measuring systems for the individual operating conditions in a joint housing, without having, however, directly visible indicating means which would be legible by the driver. The combination device, devised in accordance with the present invention, is closed up at its front visible for the driver by a neutral opaque plate which has none, or just a few markings. Inside of the housing, the indicating means of the measuring systems are formed as transparent, movable scales and arranged as diaphragms within the range of the rays of the optical projection devices. The projection devices of conventional structure have a slot between the condenser and the objective, in which the movable indicating diaphragms are adjusted by the measuring systems within the range of the rays of the optic. The indicating diaphragms may be of disc or of band shape.

The light sources of the projection devices are switched into the circuit in such a manner that only a predetermined speed or speeds of the automotive vehicle are continuously projected onto the indicating plate and the normal measuring values of the other operating conditions are only projected onto the indicating plate by means of operation of switches, or automatically in predetermined time or road distances for short time limits only. The only continuous indication on the opaque plate is the riding speed, while the other operating conditions are controlled either as required, or in accordance with another embodiment, controlled by a clock-like movement or a drive, depending upon the extent of the driving, automatically for short time intervals. The indications of abnormal operating conditions, or danger conditions, for instance the use of a reserve fuel tank, the reaching or overreaching of limit values of the temperature, of the oil pressure, etc., are, however, automatically and continuously projected onto the indicating plate until the normal conditions are restored.

The speed of the automotive vehicle is indicated preferably by the projection of the scale value, while the other operation conditions of the vehicle may be projected by corresponding words or text, which are provided instead of continuously moved scales within the range of rays of the projection optic by means of relays. Normal and abnormal operation conditions may be indicated furthermore by projection in different colors and the abnormal conditions may, if desired, be indicated in distinguishing manner also by blink lights.

The light strength of the projection optic is preferably adjustable by means of an adjustable rheostat in the light circuit. This is necessary, on the one hand, for indication for different illuminations, by day and by night, and, on the other hand, to provide the possibility for an individual adjustment of the indication.

For certain regular control indications, as for instance directional signals, far headlights, stop lights, etc., parts or marginal zones of the indicating plate may be used. For instance, for the control of the far headlights, the upper margin of the opaque plate may have a blue light indication and for indication of the stop lights, the lower margin of the opaque disc may have a red light indication.

In addition to the above-stated advantages of the combination device, devised in accordance with the present invention, not only the most favorable arrangement of all indications in the direction of the view of the driver is achieved, but also the individual measuring values are appreciably larger and clearer demonstrated than is possible with the conventional measuring devices.

With these and other objects in view, which will become apparent in the following detailed description, the present invention will be clearly understood in connection with the accompanying drawings, in which:

Figure 1 is a front elevation of the combination device;

Fig. 2 is a side elevation partly in section of the device shown in Fig. 1;

Fig. 3 is a schematic showing of the projection devices indicating the functions thereof; and Fig. 4 is another embodiment of the indication of the operating condition of the automotive vehicle.

Referring now to the drawings, a frame 1, which is formed as a diaphragm screen, is visible for the driver as a single neutral indication face in the shape of a matting plate 2. If the vehicle stands still, no indication is visible on the matting plate 2 and, during movement of the vehicle only, the enlarged projection of the prevailing speed value 3, and the adjacent scale numbers, are continuously visible. The indicator marks 4 may be provided on the back face of the matting plate 2, or they may be projected together with the measuring values. Below the matting plate 2 is the conventional mileage counting device 5 with a total and a daily counter, furthermore, at the left side therefrom an adjusting gear 6 for the adjustment of the light intensity of the projection devices, and at the right side an adjusting gear 7 for arranging the zero position of the daily counter. In the example shown in Fig. 1 of the drawing, the indication shown on the matting plate 2 of the further operating conditions, as the fuel indicator 8, the water temperature indicator 9, and the oil pressure indicator 10, are projected either upon manual operation, or automatically, merely by switching a control switch and only for short time periods, for instance, in green color. If an operation value goes beyond or below a permitted value, then the indication appears continuously and, for instance, in red color. Instead of measuring values, it is also possible to provide merely the word "normal" and as a warning expedient, merely the words "fuel reserve" "water temperature hot," etc. In order to bring about these results, the writing screens must be switchable into two positions in the projection devices by means of relays, to be pointed out below.

Fig. 2 shows the principal arrangement in accordance with the present invention in side elevation partly in section, wherein, for the purpose of better demonstration and for simplification, construction elements which are not required for an understanding of the present invention have been deleted. A plain plate 11 is arranged in front of the matting plate 2 within the frame 1. The plain plate 11 serves the purpose to protect the matting plate 2 from dust and from any depositions. The mileage counting device 5 and the adjusting gear 6 are provided below the indicating plate 2, the adjusting gear 6 serving the adjustment of the light intensity of the projecting devices. The projection devices, with the individual measuring systems, are mounted in the housing of the combination device behind the matting plate 2. A conventional eddy current system 12 is provided for the measuring of the vehicle speed. The scale disc 14, which is formed as a diaphragm, is secured to the eddy current bell 13 of the measuring system 12. This scale disc 14 extends into the range of the rays of the optical projection device 15, the optic and light arrangement being shown in dotted lines. By means of this projection device, the prevailing measuring value is enlarged and is projected onto the matting plate 2. Another projection device for the further operation values is shown in Fig. 2. A measuring system 16, for instance a rotary magnet system and the electrical fuel level indication 8, is projected by means of the projection device 18 onto the matting plate 2. The connection of the light source for the projection device 18 is fed, on the one hand, to the indicator for the normal fuel level by means of a switch, which may be manually operated, or may be operated automatically and, on the other hand, in parallel, over a warning terminal to indicate the fuel reserve of the measuring device to the plus pole of the battery of the automotive vehicle.

Referring now to Fig. 3 of the drawings, the circuit of the combination device is shown in principle. The circuits are at first connected to the terminals of the battery of the automotive vehicle by means of the ignition switch 19. The lamp 21 for the projection of the speed values, by means of the scale diaphragm 14, which is adjustable by operation of the speed measuring system 13, is, thereby, continuously put into the circuit, as long as the ignition switch 19 is in closing position. The light intensity of the lamp 21 is adjustalbe by means of an adjustable resistance 20, which may be operated by the adjusting gear 6 (Fig. 1).

The measuring device 16 serves the purpose to indicate the other operating conditions of the automotive vehicle, which measuring device 16 adjusts the scale diaphragm 17, for the indication of the fuel level, the measuring device 25 with the scale diaphragm 26 for the indication of the water temperature in the radiator and the measuring device 27 with the scale diaphragm 28 for the indication of the oil pressure. The measuring devices and the diaphragms are shown schematically only for the purpose of greater clarity.

The circuits for the lamp 22, 23 and 24 for the projection of these operating conditions by means of the scale diaphragms 17, 26 and 28 are closed by connection with the battery for short time periods only for control purposes by means of the spring biased switch 29. The switch 29 is maintained continuously in its non-operative position by means of a spring 33. Its operation may be performed manually, at will, by means of pushing the press button 34 against the effect of the spring 33. It is, however, also possible to provide an automatic control of the switch 29, either for operation within predetermined time periods by means of a clockwork, or by intermittent operation during the driving of the automotive vehicle, depending upon the movement of the vehicle.

Several circuit branches are provided, disposed parallel to the terminals of the switch 29, which permit of the connection of the lamps 22, 23 and 24 to the battery by means of the relays 30, 31 and 32, respectively. The relays 30, 31 and 32 are fed with current from the devices for the indication of the abnormal operating conditions of the vehicle.

The relay 30 closes the switch 35, when the fuel level has been reduced to the reserve level and the warning terminal for the circuit of the relay 30 has been closed by means of the giving member in the fuel tank. The switches 36 and 37 are closed in the same manner by means of the respective relays 31 and 32, when the temperature switch is closed upon overriding the limit temperature of the cooling water, and the pressure switch has been closed upon underriding the minimum oil pressure, respectively. The circuits of the relays 30, 31 and 32 are shown with their two-pole connection terminals 38, 39 and 40, respectively, for the purpose of clearer showing. The known conventional warning circuits may be used for the operating conditions as the fuel level, the water temperature of the radiator and the oil pressure.

In order to emphasize the indication of the abnormal operating conditions, the individual circuit branches are equipped with conventional blink producers 41, 42 and 43, respectively. Instead of providing blink producers for the individual circuit branches, it is also possible to provide a single, common blink producer 44, shown in dotted lines in Fig. 3. For a further distinction of the indication of the normal and abnormal operating conditions, the corresponding ranges of the scale diaphragms 17, 26 and 28 may be equipped with a layer of different colors. For instance, by providing green transparent sheets in front of the number or text picture of the normal indicating values, and red sheets in front of the values or text for the abnormal operating values, different colors will appear on the plate 2, depending upon the operating condition of the automotive vehicle. The color ranges for the scale diaphragms 17, 26 and 28, as far as they are in green color, are indicated by a range indicated g, and those which are indicating the abnormal range are indicated with the letter r for red.

Referring now to Fig. 4 of the drawings, another embodiment of the present invention is disclosed, particularly designed for the purpose of indicating the further operating conditions of the vehicle not by measuring the values, but merely by indicating "normal" or "abnormal" by proper text indication. Upon closing the ignition switch 19, a continuous indication of the speed values 3, and likewise the arranged or automatic control of the other operating conditions by means of the switch 29, are brought about in the same manner as disclosed in the embodiment shown in Fig. 3. The circuit fo the relay 30 for the fuel reserve level in the fuel tank is unchanged. Instead of providing, however, the measuring device 16 in Fig. 3 for a continuous indication or adjustment of the scale diaphragm 17, a scale diaphragm 17' is provided, which has merely the text "normal" in the green range g, and "reserve" within the red range r of the screen diaphragm 17. The latter is connected with the relay 30 by means of a lever 45' rotatably or turnably mounted upon the axle 45. As long as the warning circuit 38 is not closed by means of the reverse indicator in the fuel tank, the lamp 22 projects the word "normal" by means of the control circuit through operation of the switch 29. Only upon closing the circuit of the relay 30 and, thereby, adjustment of the diaphragm 17' by means of the lever 45' and simultaneous closing of the switch 35, the word "reserve" will be continuously projected in the red field of the diaphragm 17' as abnormal operating condition onto the matting plate 2, until such time as the fuel tank is filled again and, thereby, the circuit 38 of the relay 30 is opened.

In exactly the same manner, it is possible to indicate also the water temperature by the words "normal" and "hot" and the oil pressure by "normal" and "low," or by means of any other suitable indication.

In Figs. 1 and 2, an additional feature for further control indications, for instance, the direction signal, the far headlights and the stop light, is arranged by using the margin zones of the plate 2. It is known to indicate to the driver the switching on of the directional signals or of the far headlights or of the stop light on the dashboard by means of control lamps. These indications are likewise disposed in the plate 2. By means of red linolite-lamps 46 below the lower edge of the matting plate 2, the operation of the brake and the switching on of the stop lights is indicated by a red lit zone of the lower edge 47 of the matting plate 2. In the same manner, the lamps 48 and 49 disposed on the sides of the combination device indicate the left and the right direction signals, respectively. By means of a blue lamp 50, the switching on of the far headlights may be indicated by a blue illumination of the upper edge 51 of the matting plate 2.

While I have disclosed several embodiments of the present invention, it is to be understood that these embodiments are given by example only and not in a limiting sense, the scope of the present invention being determined by the objects and the claims.

I claim:

1. In an automotive vehicle, a device for indicating a plurality of operation conditions, as speed, fuel level and oil pressure comprising a closed housing having a front wall operating as a single projection receiving plate, an optical projection device including electric circuit means co-ordinated to each of said operation conditions to be indicated and mounted in said housing, a source of illumination disposed in each of said electric circuit means, a diaphragm screen carrying a plurality of indicia movable within the light rays of said source of illumination in response to the change of said respective operation conditions and disposed between each corresponding of said optical projection devices and said projection receiving plate, said optical projection devices being in operative alignment with said corresponding sources of illumination and said adjustable diaphragm screens in order to project said indicia onto said single projection receiving plate.

2. The device, as set forth in claim 1, which includes means for closing permanently at least one of said electric circuit means during movement of said vehicle, and means for closing the other of said electric circuit means for predetermined time intervals, a second electric circuit means disposed in parallel to each of said other of said electric circuit means, and means for closing permanently said second electric circuit means in response to disturbances of the operations indicated by said co-ordinated diaphragm screens and for opening said second electric circuit means upon removal of said disturbances.

3. The device, as set forth in claim 2, which includes manually operated means for closing said other of said electric circuit means.

4. The device, as set forth in claim 2, wherein said means for closing the other of said electric circuit means for predetermined time intervals are responsive to the length of travel of said vehicle.

5. The device, as set forth in claim 1, wherein said other of said projection devices include means for projecting said indicia for predetermined time intervals onto said projection receiving plate in a predetermined color and means for projecting said indicia in response to disturbances of the operations in a color different from said predetermined color.

6. The device, as set forth in claim 5, which includes flasher means operatively connected with said means for projecting said indicia in response to disturbance of operations.

7. The device, as set forth in claim 1, wherein each of said diaphragm screens bears a plurality of numerals to project in numbers the operation conditions onto said projection receiving plate.

8. The device, as set forth in claim 1, wherein each of said diaphragm screens bears a text to project in words the operation conditions onto said projection receiving plate.

9. The device, as set forth in claim 1, which includes means for adjusting the intensity of each of said sources of illumination.

10. The device, as set forth in claim 1, wherein said projection receiving plate has means for indicating in at least one additional marginal zone an additional control signal.

References Cited in the file of this patent
UNITED STATES PATENTS

| | | |
|---|---|---|
| 2,737,845 | Mihalakis | Mar. 13, 1956 |
| 2,738,491 | Mihalakis | Mar. 13, 1956 |